Sept. 16, 1941.   C. M. HINES   2,256,285
BRAKE CONTROL MEANS
Filed March 28, 1940   2 Sheets-Sheet 2

INVENTOR
CLAUDE M. HINES
BY
ATTORNEY

Patented Sept. 16, 1941

2,256,285

UNITED STATES PATENT OFFICE 2,256,285

BRAKE CONTROL MEANS

Claude M. Hines, Pittsburgh, Pa., assignor to The Westinghouse Air Brake Company, Wilmerding, Pa., a corporation of Pennsylvania Application March 28, 1940, Serial No. 326,351

13 Claims. (Cl. 303—21)

This invention relates to brake control means for vehicles, such as railway cars and trains, and has particular relation to brake control apparatus including means automatically responsive to the rate of rotative deceleration of individual vehicle wheels or pairs of wheels for so controlling the degree of application of the wheel brakes as to effect a substantially uniform rate of retardation of the vehicle; and for effecting a rapid reduction in the degree of application of the brakes associated with individual wheels or pairs of wheels when the wheels begin to slip, to prevent the sliding thereof.

In Patent No. 2,132,959 of Joseph C. McCune there is described and claimed a brake control apparatus of the character indicated in the foregoing paragraph. The apparatus described in this patent includes a rotary inertia device of the fly-wheel type operatively responsive to the rate of rotative deceleration of the wheels of an individual wheel-and-axle unit comprising a pair of wheels fixed to opposite ends of a connecting axle.

It is an object of my present invention to provide an improved brake control equipment for effecting the same general functions described in the above-mentioned patent but differing specifically in structure and mode of operation therefrom in providing electrical apparatus responsive to the rate of rotative deceleration of individual wheel-and-axle units, whereby to simplify the equipment and reduce the cost thereof.

The above object, and other objects of my invention which will be made apparent hereinafter, are attained by several embodiments of my invention subsequently to be described and shown in the accompanying drawings wherein—

Figure 1:
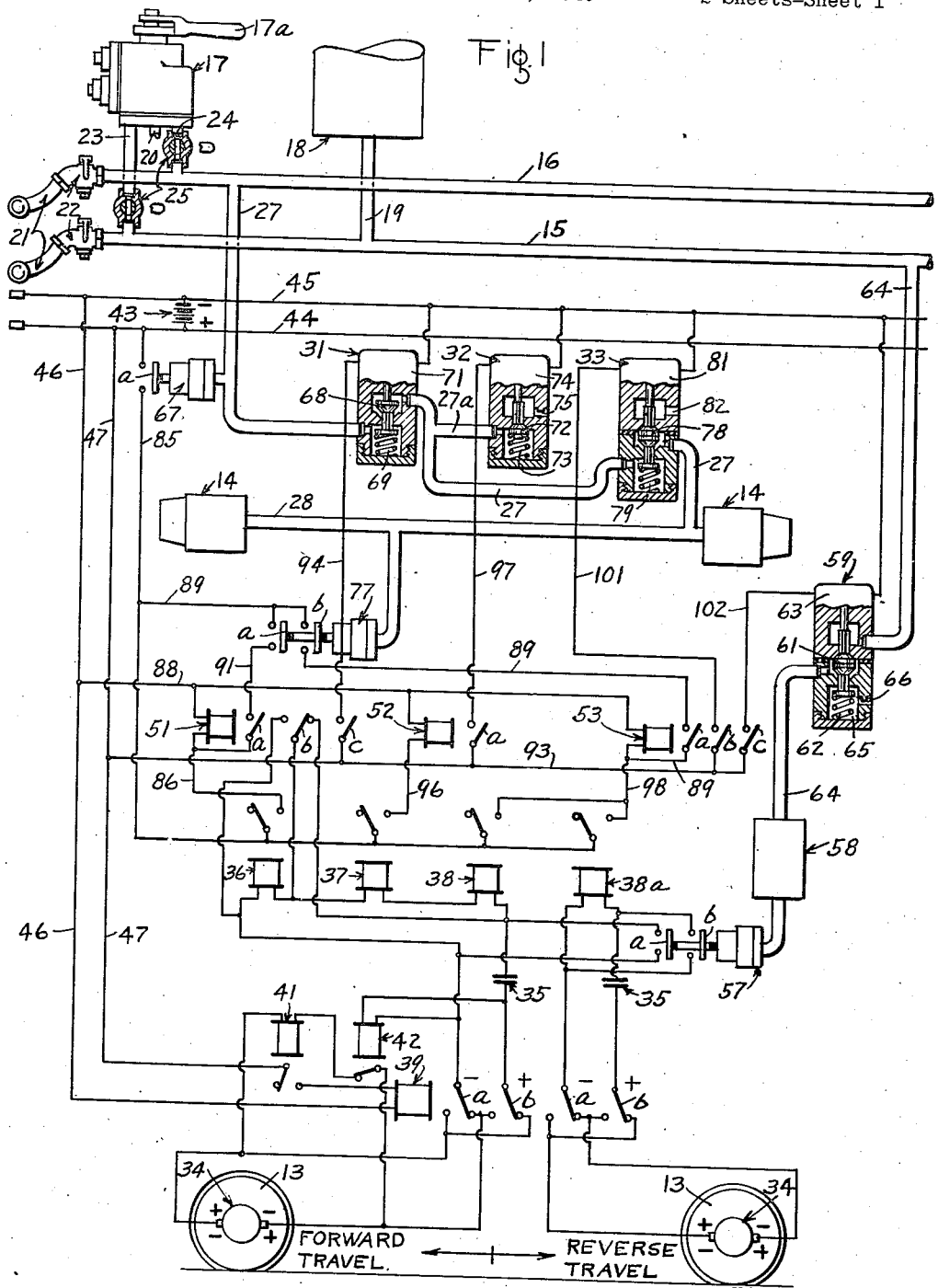
Fig. 1 is a fragmental diagrammatic view of one embodiment of my invention.

*Description of embodiment shown in Fig. 1*

Referring to Fig. 1, the equipment shown is limited to that for a single wheel truck of the two-axle four-wheel type, the equipment for other wheel trucks on the same car or on other cars duplicating that shown.

It will be understood, therefore, that the two wheels 13 shown in Fig. 1 correspond respectively to the two wheel units of a four-wheel truck and that each of the wheels 13 is fixed to an axle, not shown, to the opposite end of which a similar wheel is fixed. The term "wheel unit" as employed hereinafter may refer either to a single wheel or a plurality of connected wheels.

In the subsequent description, it will be assumed that movement of the vehicle in the left-hand direction indicated by the arrow at the bottom of the figure corresponds to the forward direction of travel and the movement of the vehicle in the right-hand direction and indicated by the second arrow corresponds to reverse travel. The left-hand wheel unit will accordingly be referred to hereinafter as the leading unit and the right-hand wheel unit as the trailing unit, on the assumption that the vehicle is moving in a forward direction.

The brakes (not shown) associated with the wheels 13 may be of the conventional clasp shoe type or of the not-so-conventional rotary disk or drum type associated with the axle connecting the two wheels of a wheel unit.

Since the brakes are operated by fluid pressure operated devices, it is deemed sufficient for the purposes of the present application, to show only the fluid pressure operated devices 14. The devices 14 are illustrated as conventional brake cylinders but it is intended that they represent any type of fluid pressure responsive operator for applying and releasing the brake devices associated with the vehicle wheels.

Any suitable number of brake cylinders 14 may be provided for each wheel unit of a wheel truck, although in Fig. 1 one brake cylinder is provided for each wheel unit.

For purposes of illustration, a simplified pneumatic or fluid pressure control system is shown including two train pipes, hereinafter respectively referred to as the supply pipe 15 and the control pipe 16, a manually operative self-lapping brake valve 17 for controlling the pressure in the control pipe 16 and a reservoir 18 hereinafter referred to as the main reservoir which is connected as by a branch pipe 19 to and correspondingly charges the supply pipe 15.

It will be understood that the supply pipe 15 and control pipe 16 extend from end to end longitudinally through a car and, in the case of a train of cars, the sections of the pipes on each car are connected through suitable hose couplers 21 of conventional type. The opposite ends of each pipe 15 and 16 are provided with angle cocks 22 whereby to open and close the ends of the pipe as desired.

The brake valve 17 is connected by a branch pipe 23 to the supply pipe 15 and by a branch pipe 24 to the control pipe 16, each of the branch pipes 23 and 24 having therein a manually operable valve 25 illustrated as of the plug type.

If the car is at the head end of a train or operating as a single unit, the angle cocks 22 are closed as shown and the valves 25 are operated to open position as shown. If the car is in an intermediate position between two cars in a train, the angle cocks 22 are operated to open position and the valves 25 are operated to closed position. It will thus be apparent that in the latter case, the valves 25 cut the brake valve 17 out of operation so that the pressure of the fluid in the control pipe 16 may be controlled by a similar brake valve on another car.

While not shown, it will be understood that the main reservoir 18 is charged to the normal pressure carried therein by means of a fluid compressor not shown.

When the control pipe 16 is charged with fluid under pressure, fluid under pressure flows from the control pipe through a branch pipe 27 to the two brake cylinders 14. As shown, the two brake cylinders 14 are connected by a pipe or conduit 28 and the branch pipe 27 is connected to the pipe 28.

Associated with the branch pipe 27 are three magnet valve devices 31, 32 and 33, hereinafter referred to as the cut-off valve, the slow-release valve, and the fast-release valve respectively.

The magnet valves 31, 32 and 33 are controlled automatically in accordance with the rate of rotative deceleration of the vehicle wheels by means of electrical apparatus now to be described.

The electrical apparatus referred to comprises a suitable generator or magneto 34 associated with each individual wheel-and-axle unit and adapted to supply a direct-current voltage substantially proportional to the speed of rotation of the wheels of the corresponding unit and of opposite polarity for opposite directions of rotation of the wheels. The rotary armature of each generator 34 may be driven according to the rotation of the corresponding wheels, as by mounting the generator in the journal at one end of an axle and coupling the armature shaft of the generator in coaxial relation to the end of the axle.

Connected in series relation across the brush terminals of the generator 34 associated with the leading wheel unit are an electrical condenser 35 of suitable capacity and three electrical relays 36, 37 and 38 respectively. Connected in series relation across the brush terminals of the generator 34 associated with the trailing wheel unit are a similar electrical condenser 35 and a relay 38a.

The circuit connections to the brush terminals of the two generators 34 are reversible under the control of a suitable reversing relay 39 which is in turn controlled by a relay 41 of the polarized type controlled according to the polarity of the voltage at the brush terminals of the generator 34 for the leading wheel unit. In addition, a cut-out relay 42 of the voltage-responsive type subject to the voltage across the brush terminals of the generator 34 associated with the leading wheel unit is provided for interrupting the connection of the winding of the relay 41 across the brush terminals of the associated generator 34 when the voltage at the brush terminals of the generator 34 exceeds a certain value corresponding to a certain low speed of rotation of the vehicle wheels, such as occurs at eight miles per hour travel of the car.

The polarized relay 41 is so designed that the single contact member thereof is maintained in the left-hand or open position thereof when the winding of the relay is energized by flow of current in one direction as a result of the polarity of the voltage across the brush terminals of the generator 34 occurring when the car travels in a forward direction. Conversely, when the car is traveling in the reverse direction and the polarity of the voltage at the brush terminals of the generator 34 is correspondingly reversed, the reverse direction of flow of current through the winding of the relay 41 causes the contact member thereof to be actuated to its right-hand or closed position. Upon the actuation of the contact member of the polarized relay to its closed position, a circuit is completed for energizing the winding of the reversing relay 39.

The current for energizing the relay 39 is supplied from a suitable source of direct-current, such as a storage battery 43, which may be the usual storage battery forming a part of the lighting or illuminating equipment on the car. For simplicity, the usual equipment for maintaining the battery 43 charged is omitted.

The opposite terminals of the battery 43 are connected to two train wires 44 and 45 respectively. It will be assumed that the train wire 44 is connected to the positive terminal of the battery and this wire will therefore hereinafter be referred to as the positive battery wire. The train wire 45 is assumed to be connected to the negative terminal of the battery 43 and is therefore hereinafter referred to as the negative battery wire. For convenience, circuits will be traced hereinafter from the positive to the negative battery wires, it being understood that this is tantamount to the positive and negative terminals of the battery 43.

One of the terminals of the winding of the relay 39 is connected by a branch wire 46 to the negative battery wire 45 and the other terminal is adapted to be connected to the positive battery wire 44 through a branch wire 47 subject to the control of the contact member of the polarized relay 41.

It will thus be apparent that when the car is traveling in a forward direction, the winding of the reversing relay 39 is always deenergized and, conversely, that when the vehicle travels in a reverse direction the winding of the reversing relay 39 is always energized.

It will be understood that the contact member of the relay 41 remains in a position to which it was last actuated until the direction of flow of current through the winding of the relay is reversed. Thus, the interruption of the energizing circuit to the winding of the relay 41 effected by the cut-out relay 42 when the car exceeds a speed of eight miles per hour does not cause the return of the contact member of the polarized relay 41 from its closed to its open position when the car is traveling in a reverse direction.

The reversing relay 39 is provided with a plurality of pairs of contact members, each pair comprising contact members a and b, respectively. As shown, the reversing relay 39 has only two pairs of contact members a and b. It will be understood, however, that the reversing relay 39 may be provided with additional pairs of contact members a and b for controlling the series circuit connections across the brush terminals 34 of generators (not shown) associated with other wheel trucks of the car, if desired, thereby avoiding duplication of the three relays 39, 41 and 42 for each wheel truck of a car.

When the winding of the reversing relay 39 is deenergized, the contact members a and b of each pair are in the dropped-out position thereof as shown. When the winding of the relay 39 is energized, the contact members a and b are actuated to the picked-up position opposite to that in which they are shown. The contact members a and b of each pair function in well-known manner to reverse the connections across the brush terminals of the corresponding generator 34 so that the polarity of the generator voltage impressed on the circuit is not reversed with reversal of direction of travel of the car.

Assuming that the contact members a and b of the reversing relay 39 are in the position shown and that the left-hand brush terminal of each generator is of positive polarity while the right-hand brush terminal is of negative polarity when the car travels in a forward direction, it will be seen that when the car accelerates in a forward direction, the condenser 35 in the circuit associated with each generator has a charging current supplied thereto from the generator, the direction of flow of current through the relays 36, 37 and 38 or 38a being in a certain corresponding direction. As is well known, the condenser charging current is substantially proportional to the rate of increase of voltage at the brush terminals of the generator 34, which is in turn proportional to the rate of acceleration of the vehicle wheels.

Conversely, when the car decelerates, the voltage at the brush terminals of each generator 34 decreases at a corresponding rate and the condenser 35 correspondingly discharges a current in the circuit in the opposite direction to the charging current, which discharge current is likewise substantially proportional to the rate of reduction of voltage at the brush terminals of the generator 34 and therefore proportional to the rate of rotative deceleration of the corresponding vehicle wheels.

The relays 36, 37 and 38 in the circuit of the generator 34 associated with the leading wheel unit are of the uni-directional responsive type, that is, they are respectively responsive only to a current exceeding certain predetermined values and flowing in one certain direction.

The relay 36 is so designed and so connected that when the condenser discharge current in the circuit exceeds a certain value corresponding to a certain rate of deceleration of the associated car wheels 13, such as four miles per hour per second, the contact member of the relay is actuated from its open to its closed position and held in the closed position only so long as the condenser discharge current exceeds such certain value, the contact member being automatically returned to its open position when the condenser discharge current reduces below the certain predetermined value and maintained in its open position in response to any condenser charging current.

The relay 37 is so designed and so connected that the single contact member thereof is biased to its open position shown in response to condenser charging current and actuated from its open to its closed position only in response to a condenser discharge current exceeding a certain value and corresponding to a certain rate of rotative deceleration of the associated car wheels such as five miles per hour per second, the contact member being automatically restored to its open position whenever the condenser discharge current through the winding reduces below the said certain value.

The relay 38 is so designed and so connected that the single contact member thereof is biased to its open position shown in response to the condenser charging current and actuated from its open to its closed position only when the condenser discharge current exceeds a certain value corresponding to a rate of rotative deceleration of the associated car wheels of ten miles per hour per second.

The relay 38a in the circuit of the generator 34 for the trailing wheel unit is so designed and so connected that the single contact member of the relay is biased to its open position in response to condenser charging current and is actuated from its open to its closed position whenever and as long as the condenser discharge current exceeds a certain value corresponding to a rate of rotative deceleration of the associated car wheels of ten miles per hour per second.

As is well known, it is possible to effect a rate of deceleration or retardation of a car at a rate between four and five miles per hour per second, under normal conditions of the road surface or rails without causing the wheels to slip or slide. If the degree of application of the brakes on the wheels is such, however, as to exceed the adhesion or rolling friction between the wheels and the road surface or rails, the wheels slip and rapidly decelerate toward a locked or non-rotative condition and slide, the rate of rotative deceleration of the slipping wheels exceeding ten miles per hour per second.

I accordingly employ the relays 36 and 37, in the manner hereinafter to be more clearly pointed out, to control the magnet valves 31 and 32 so as to regulate the pressure in the brake cylinders 14 in a manner to cause the retardation of the car wheels at a rate somewhere between four and five miles per hour per second under normal conditions. In addition I employ the relays 38 and 38a to control the magnet valve 33 so as to effect a fast reduction of the pressure in the brake cylinders 14 when the wheels begin to slip.

In order to provide for the control of the magnet valves 31, 32 and 33 by the corresponding relays 36, 37 and 38, and 38a, three additional electrical relays of the neutral type, namely relays 51, 52 and 53 are provided. As will be explained in greater detail hereinafter, the relay 51 is controlled by the relay 36, the relay 52 is controlled by the relay 37, and the relay 53 is controlled by either the relay 38 or the relay 38a.

The relay 51 has an operating winding and three contact members a, b, and c. The contact members a and c are front-contact members, that is, they are biased to the open or dropped-out position thereof when the winding of the relay is deenergized and are actuated to a closed or picked-up position whenever and as long as the relay winding is energized. The contact member b is a two-position contact, that is, it acts as a back-contact in its dropped-out position when the winding of the relay is deenergized, and as a front-contact when the relay winding is energized.

The relay 52 has an operating winding and a single front-contact member a which is biased to its open position when the relay winding is deenergized and which is actuated to its closed position in response to energization of the relay winding and maintained in its closed position as long as the relay winding is energized.

The relay 53 has an operating winding and the three front contact members a, b and c, each of which is biased to its open position when the winding of relay is deenergized and actuated to and maintained in its closed position upon energization of the relay winding.

Associated with the relays 36, 37, 38 and 38a is a short-circuiting fluid pressure operated switch 57 having an associated volume reservoir 58 and a control magnet valve 59.

The pressure operated switch 57 may be of any suitable type, preferably of the snap-acting type, adapted to operate in response to the variation of an operating fluid pressure supplied thereto from one side to the other of a certain critical pressure. As shown, the pressure switch 57 has two contact members a and b which are actuated out of contact with a pair of associated contact members whenever the pressure supplied thereto reduces below a certain low pressure, such as five pounds per square inch, and which are snapped to and held in a closed position engaging the associated pair of contact members whenever and as long as the pressure supplied thereto exceeds and remains above such critical pressure. The volume reservoir 58 is provided for adding volume to the pressure chamber of the pressure switch 57.

Fluid under pressure is supplied to the pressure switch 57 from the supply pipe 15 and released under the control of the magnet valve 59. The magnet valve 59 is of conventional type having a double beat valve 61 which is biased to an upper seated position by a spring 62 and which is actuated to a lower seated position in response to energization of a suitable electromagnet winding 63. In its upper seated position, the valve 61 establishes communication from a pipe 64 leading to the volume reservoir 58 and the connected pressure chamber of the pressure switch 57 to a chamber 65 in the magnet valve device 59 which is constantly open to atmosphere through a restricted port 56. In its lower seated position, the valve 61 closes the exhaust communication just described and establishes another communication connecting the pipe 64 to another section of the pipe 64 which is in turn connected to the supply pipe 15.

It will thus be seen that when the magnet winding 63 of the magnet valve device 59 is energized, fluid at the pressure in the supply pipe 15 and reservoir 18 is supplied to the volume reservoir 58 and pressure chamber of the pressure switch 57 to cause the contact members a and b to be actuated to the closed positions thereof. When the magnet winding 63 is deenergized, the supply communication is closed and the exhaust communication is established. The volume of the reservoir 58 and the size of the restricted port 56 are such that a predetermined time is required for the pressure in the pressure chamber of the pressure switch 57 to reduce sufficiently to cause the return of the contact members a and b to the open positions thereof.

Contact member a of pressure switch 57 is effective in its closed position to establish a shunt connection around the operating windings of the relays 36, 37 and 38 and the contact member b is effective in its closed position to establish a shunt connection around the operating winding of the relay 38a.

The magnet winding 63 of the magnet valve device 59 is energized and deenergized under the control of the contact member c of the relay 53 in the manner to be hereinafter more fully described. The purpose of the pressure operated switch 57 and the time-delay opening thereof will be made apparent hereinafter.

The apparatus further includes two fluid pressure operated switches 67 and 77 similar in structure and operation to the pressure operated switch 57. The pressure operated switch 67 has a single contact member a which is snapped out of engagement with the associated pair of contact members when the operating pressure supplied to the pressure chamber of the switch device from branch pipe 27 reduces below a certain critical low pressure, such as five pounds per square inch, and which is snapped to and held in a closed position engaging the pair of associated contact members whenever and as long as the pressure exceeds and remains above such critical pressure.

The pressure operated switch 77 has two contact members a and b, each of which is snapped to an open position out of engagement with a pair of associated contact members when the pressure in the brake cylinders 14 reduces below a certain pressure, such as ten pounds per square inch, and which is snapped to a closed position engaging the associated pair of contact members whenever and as long as the pressure in the brake cylinders exceeds and remains above such critical pressure.

The respective functions of the pressure operated switches 67 and 77 will be made apparent in the subsequent description of an operation of the equipment.

Before proceeding with a description of the operation of the equipment, the magnet valves 31, 32 and 33 will be briefly described. The magnet valve 31 comprises a single valve 68 of the poppet type which is biased to an unseated position by a coil spring 69 and actuated to its seated position in response to energization of the electromagnet or magnet winding 71. In its unseated position, the valve 68 establishes communication between the section of the branch pipe 27 connected to the control pipe 16 and an intermediate section of the pipe 27 leading from the magnet valve 31 to the magnet valve 33. In its seated position, the valve 68 closes such communication between these two sections of the pipe 27, thus effectively preventing the supply of fluid under pressure from the control pipe 16 through the pipe 27 to brake cylinders 14. Magnet valve 31 is thus designated the cut-off valve.

Magnet valve 32 comprises a single valve 72 of the poppet type which is biased to a seated position by a coil spring 72 and which is actuated to an unseated position in response to energization of the electromagnet or magnet winding 72. When the valve 72 is unseated, it establishes communication from the branch pipe 27a of the intermediate section of the pipe 27 to atmosphere through a restricted port 75. The port 75 is of such size as to cause a relatively slow reduction of the pressure in the brake cylinders 14. In its seated position, the valve 72 closes the exhaust communication just described.

The magnet valve 33 comprises a double beat valve 78 which is biased to an upper seated position by a coil spring 79 and actuated to a lower seated position in response to energization of the electromagnet or magnet winding 81. In its upper seated position, the valve 78 establishes communication between the intermediate section of the pipe 27 and the end section of the pipe 27 which opens into the pipe 28 connecting the brake cylinders 14. In its lower seated position, the valve 78 closes communication between the two sections of the pipe 27 and establishes a communication from the end section 27 and the connected brake cylinders to atmosphere through an exhaust port 82. The port 82 is of such size as to cause a rapid reduction of pressure in the brake cylinders 14.

*Operation of equipment shown in Fig. 1*

Let it be assumed that the car having the equipment shown in Fig. 1 is at the head end of the train of cars or is operating as a single car. In such case the angle cocks 22 at the head end of the car are in closed position as shown and the valves 25 are in open position so that the brake valve 17 is effective to control the pressure in the control pipe 16. Let it be further assumed that the main reservoir 18 is charged and maintained charged to the normal pressure carried therein, as for example one hundred pounds per square inch. Let it be further assumed that the brake valve handle 17a is in its release position so that the pressure in the pipe 16 is reduced to atmospheric pressure and the brakes released while the car is traveling in the forward direction at a speed such as sixty miles per hour. In such case, the winding of the reversing relay 39 is deenergized and the energizing circuit for the operating winding of the polarized relay 41 is interrupted due to the pick-up or opening of the contact member of the cut-out relay 42. With the winding of the reversing relay 39 deenergized, the pairs of contact members a and b thereof are correspondingly biased to the position in which they are shown.

With the car traveling at a constant speed, the current in the circuit of each of the generators 34 is substantially zero and accordingly the contact members of the relays 36, 37, 38 and 38a are biased to the open positions thereof as shown. The relays 51, 52 and 53 are correspondingly biased to the dropped-out position thereof as shown.

To effect an application of the brakes, the operator shifts the brake valve handle 17a in a horizontal plane out of the release position into its application zone an amount corresponding to the desired degree of application of the brakes. Fluid under pressure is accordingly supplied from the main reservoir 18 and the supply pipe 15 to the control pipe 16 under the control of the self-lapping valve mechanism of brake valve 17, the pressure established in the control pipe 16 being automatically regulated to a pressure corresponding to the amount of displacement of the brake valve handle out of its release position. Assuming that a pressure of forty pounds per square inch is established in the control pipe, fluid at the same pressure is correspondingly supplied through the branch pipe 27 to the brake cylinders 14 to effect application of the brakes on the wheels 13 of the car to a corresponding degree. Since the pressure established in the control pipe 16 and in the brake cylinders 14 exceeds the critical operating pressures for the pressure switches 67 and 77, these switches are correspondingly both actuated to the closed positions thereof.

If the rate of retardation of the car and, correspondingly, the rate of rotative deceleration of the car wheels 13 effected in response to the application of the brakes does not reach four miles per hour per second, no further operation of the equipment occurs, the magnet valves 31, 32 and 33 remaining deenergized and, therefore, conditioned as shown.

If, however, the degree of application of the brakes is such or becomes such that the rate of rotative deceleration of the car wheels exceeds four miles per hour per second, the contact member of the relay 36 is actuated to its closed position to effect energization of the winding of the relay 51. The circuit for energizing the winding of the relay 51 extends from the positive battery wire 44 by way of a branch wire 85 including the contact member a of the pressure switch 67 in its closed position, the contact member of relay 36, a wire 86 including the winding of relay 51, a wire 88 and branch wire 46 back to the negative battery wire 45.

Upon energization of the winding of the relay 51 the contact member a of the relay becomes effective in its closed position to establish a self-holding circuit for maintaining the winding of the relay energized thereafter independently of the contact member of the relay 36. This circuit extends from the positive battery wire 44 by way of the branch wire 85 including the contact member a of the pressure switch 67, a branch wire 89, a second branch wire 91 including contact member a of the pressure switch 77 and contact member a of the relay 51, wire 86, winding of the relay 51, and wires 88 and 46 back to the negative battery wire 45.

Thus, once the contact members of relay 51 are picked-up in response to energization of the winding of the relay, they remain picked-up thereafter subject to the opening of the contact member a of the pressure switch 77 or contact member a of pressure switch 67.

The contact member b of relay 51 establishes a shunt connection around the operating windings of the relays 37 and 38 when the contact members of the relay 51 are dropped-out. This shunt connection reduces the resistance of the generator circuit and at the same time prevents undesired operation of the relays 37 and 38. In its picked-up position, the contact member b of the relay 51 interrupts this shunt connection, thus rendering relays 37 and 38 responsive thereafter to current exceeding the critical operating values thereof respectively, and at the same time establishes a shunt connection around the operating winding of the relay 36. With the operating winding of relay 36 shunted by contact member b of relay 51, the contact member of the relay 36 is restored promptly to its open position. Due to the holding circuit for relay 51 previously described, however, the opening of the contact member of the relay 36 does not cause drop-out of the relay 51.

In its picked-up or closed position, the contact member c of the relay 51 establishes a circuit for energizing the magnet winding 71 of the cut-off valve 31. This circuit extends from the positive battery wire 44 by way of the branch wire 47, a bus wire 93, contact member c of relay 51, and a wire 94 including the magnet winding 71 of the cut-off valve 31 back to the negative battery wire 45. Communication through the pipe 27 to the brake cylinders 14 is thus closed and the further supply of fluid under pressure to the brake cylinders from the control pipe 16 is prevented. If the cut-off valve 31 operates before the desired pressure is established in the control pipe 16, the pressure in the control pipe may increase to a value higher than that established in the brake cylinders 14.

As is well known, the coefficient of friction between the brake shoes and the rim of a car wheel increases as the speed of the car reduces so that the rate of rotative deceleration of the car wheels is automatically increased, as the speed of the car reduces, without any change in brake cylinder pressure. Accordingly, when the rate of rotative deceleration of the car wheels, as exemplified by the wheels of the leading wheel unit of the truck shown in Fig. 1, exceeds the rate of five miles per hour per second, the contact member of the relay 37 is actuated to its closed position to effect energization of the winding of the relay 52. The circuit for energizing the winding of the relay 52 extends from the positive battery wire 44 by way of the branch wire 85 including contact member a of the pressure switch 67, the contact member of relay 37, a wire 96 including the winding of the relay 52, wire 88 and branch wire 46 back to the negative battery wire 45.

Contact member a of the relay 52 is correspondingly actuated to its closed position to effect energization of the magnet winding 74 of the slow-release valve 32. This circuit extends from the positive battery wire 44 by way of the branch wire 47, bus wire 93, contact member a of relay 52, a wire 97 including the magnet winding 74 of the slow-release valve 32 back to the negative battery wire 45.

Upon energization of the magnet winding 74 thereof, the slow-release valve 32 is effective to cause a relatively slow reduction of the pressure in the brake cylinders 14 by exhaust through the restricted port 75. Due to the reduction of the pressure in the brake cylinders 14 effected by the slow-release valve 32, the degree of application of the brakes is correspondingly diminished and, as a result, the rate of rotative deceleration of the car wheels promptly diminishes to a value below five miles per hour per second.

Upon the reduction of the rate of rotative deceleration of the wheels 13 of the leading wheel unit below five miles per hour per second, the contact member of the relay 37 is restored to its open position and deenergization of the winding of relay 52 is correspondingly effected. The contact member a of the relay 52 is correspondingly restored to its open position to effect deenergization of the magnet winding 74 of the slow-release valve 32 and the consequent cut-off of further reduction of pressure in the brake cylinders 14.

If, as the speed of the car reduces further, the increase of the coefficient of friction between the brake shoes and car wheels again causes an increase in the rate of rotative deceleration of the car wheels to a value in excess of five miles per hour per second, the relay 37 is again operated to cause pick-up of the relay 52 and the consequent energization of the magnet winding 74 of the slow-release relay 32.

It will thus be seen that the pressure in the brake cylinders 14 is automatically adjusted as the speed of the car reduces so as to maintain a substantially uniform rate of rotative deceleration of the car wheels and consequently a substantially uniform rate of retardation of the car of somewhere between four and five miles per hour per second.

In the previous description of the operation, it was assumed that none of the wheels of the car or truck shown slip. If the wheels of either the leading or the trailing wheel units begin to slip, a further operation occurs which will now be described. Let it be assumed that, the wheels 13 of the trailing wheel unit begin to slip during an application of the brakes. In such case, the contact member of the relay 38a is actuated from its open to its closed position, thereby effecting energization of the operating winding of the relay 53. The circuit for energizing the winding of the relay 53 extends from the positive battery wire 44 by way of the branch wire 85 including the contact member a of the pressure switch 67, the contact member of relay 38a, a wire 98 including the winding of the relay 53, and wires 88 and 46 back to the negative battery wire 45.

Contact member a of relay 53 is effective in its picked-up position to establish a self-holding circuit for maintaining the winding of the relay 53 energized independently of the subsequent opening of the contact member of the relay 38a. This holding circuit extends from the positive battery wire 44 by way of the branch wire 85 including the contact member a of the pressure switch 67, wire 89 including contact member b of the pressure switch 77 and contact member a of the relay 53, wire 98 including the magnet winding of the relay 53, and wires 88 and 46 back to the negative battery wire 95. Thus, once the winding of the relay 53 is energized in response to the operation of the relay 38a (or relay 38 as will hereinafter appear) the winding is thereafter maintained energized subject to the opening of the contact member b of the pressure switch 77.

The contact member b of relay 53 is effective in its picked-up or closed position to establish a circuit for energizing the magnet winding 81 of the fast-release valve 33. This circuit extends from the positive battery wire 44 by way of the branch wire 47, bus wire 93, contact member c of relay 53, and a wire 101 including the magnet winding 81 of the fast-release valve 33 back to the negative battery wire 45.

Upon energization of the magnet winding 81 of the fast-release valve 33, communication through the branch pipe 27 is closed and fluid under pressure is rapidly exhausted from the brake cylinders 14 through the exhaust port 82 of the fast-release valve 33.

Due to the operation of the fast-release valve 33 substantially at the instant that the wheels of the trailing wheel unit begin to slip, and the consequent rapid reduction of the pressure in the brake cylinders 14, the rate of rotative deceleration of the slipping wheels promptly decreases and the wheels begin to accelerate back toward a speed corresponding to vehicle speed without reducing in speed to a locked-wheel state and sliding.

The contact member c of the relay 53 is effective in its picked-up or closed position to establish a circuit for energizing the magnet winding 63 of the magnet valve 59, such circuit extending from the positive battery wire 44 by way of the wires 47 and 93, contact member c of the relay 53, and a wire 102 including the magnet winding 63 of the magnet valve 59 back to the negative battery wire 45.

Upon energization of the magnet winding 63 of the valve 59, the charging communication of the volume reservoir 58 and the connected pressure chamber of the pressure operated switch 57 is established and the pressure operated switch contacts a and b are thus promptly actuated to the closed positions thereof. With the contact members a and b of the pressure operated switch 57 in their closed positions, the windings of relays 36, 37, 38 and 38a are shunted and, therefore, the contacts of the relays are restored to and maintained in their open positions notwithstanding the rate of deceleration of the car wheels. Due to the holding circuits, previously described, for relays 51 and 53, the opening of the contact members of relays 36 and 38a does not cause drop-out of relays 51 and 53. The opening of the contact member of relay 37 prevents pick-up of relay 52 and consequently the exhaust operation of the slow-release magnet valve 32.

It will be seen that although the wheels of the leading wheel unit may not have slipped, nevertheless, due to the reduction of the pressure in the brake cylinder therefor, slipping of these wheels is accordingly prevented.

When the pressure in the brake cylinders 14 is reduced by the fast-release valve 33 to a value below ten pounds per square inch, the contact members a and b of the pressure switch 77 are snapped back to their open positions thereby respectively interrupting the holding circuits, previously described, for the windings of the relays 51 and 53 respectively.

The time required to reduce the pressure in the brake cylinders from the established value to below ten pounds per square inch requires a certain length of time which is longer than that required for the slipping wheels to return fully to a speed corresponding to car speed. Accordingly the car wheels 13 are decelerating rotatively at a rate corresponding to the average rate of retardation of the car at the time the contact members of the pressure operated switch 77 open. It is necessary therefore to prevent relay 36 from operating, in response to the rate of rotative deceleration of the car wheels at a rate exceeding four miles per hour per second, to pick-up the relay 51 immediately following the interruption of the holding circuit for the winding of the relay 51 by opening the contact member a of the pressure operated switch 77. The pressure operated switch 57 functions to effect this result by maintaining the shunt connection around the windings of relays 36, 37, 38 and 38a.

It will be understood that when the holding circuit for the winding of the relay 53 is interrupted by the contact member b of the pressure operated switch 77, magnet winding 31 of the fast-release valve 33 is instantly deenergized thereby correspondingly restoring the communication through the branch pipe 27 to the brake cylinders 14 and cutting off the exhaust communication through the exhaust port 82. If the relay 36 were permitted to operate to pick-up the relay 51, which in turn would cause energization of the magnet winding 71 of the cut-off valve 31, fluid under pressure could not be resupplied to the brake cylinders 14 and the pressure in the brake cylinders of any wheel truck on which a wheel slips during an application of the brakes would thereafter be limited to the low value of less than ten pounds per square inch. The degree of application of the brakes effected in response to a brake cylinder pressure of less than ten pounds per square inch is relatively small and consequently adequate braking of the car or train would be impaired and the stopping distance of the car or train unduly lengthened.

When the magnet winding 63 of the magnet valve 59 is deenergized in response to the drop-out or opening of the contact member c of the relay 53, the charging communication for the volume reservoir 58 is closed and the exhaust communication is established through which fluid under pressure is exhausted in a predetermined time through the restricted port 56. The contact members a and b are thus maintained in short-circuiting or closed position for a certain interval of time, such as two or three seconds, following the drop-out of the relays 51 and 53 so as to prevent an operative response of the relay 36 and of the relays 37, 38 and 38a to the rate of rotative deceleration of the car wheels of that truck.

During this delayed interval of time, therefore, the magnet windings of the three magnet valves 31, 32 and 33 remain deenergized. Thus fluid under pressure is resupplied through the pipe 27 to the brake cylinders 14 to reestablish a substantial pressure which may be any desired fraction of the pressure established in the control pipe 16 or the full pressure in the control pipe.

Upon the restoration of the contact members a and b of the pressure operated switch 57 to their open positions upon the elapse of a certain interval of time following the deenergization of the winding 63 of the magnet valve 59, the contact member of the relay 36 is again actuated to its closed position because the car wheels are decelerating rotatively at a rate at least exceeding four miles per hour per second as a result of the average rate of retardation of the car being in excess of four miles per hour per second. The winding of the relay 51 is correspondingly energized in response to the operation of the contact member of relay 36 to its closed position in the manner described.

Due to the fact that the pressure in the brake cylinders 14 has in the meantime been restored to a value in excess of ten pounds per square inch, the contact members a and b of the pressure operated switch 77 have been restored to their closed positions so that, upon the energization of the winding of the relay 51, the holding circuit for relay 51 including the contact member a of the relay 51 and the contact member a of the pressure switch 77 is again established. In a similar manner, the restoration of the contact member c of relay 51 to its closed position causes energization of the magnet winding 71 of the cut-off valve 31 and the consequent prevention of the further supply of fluid under pressure to the brake cylinders 14. Obviously, therefore, the pressure reestablished in the brake cylinders 14 following slipping of the wheels, is limited according to the time the pressure switch 57 maintains the relays 36 short-circuited after relay 53 drops out.

If the rate of rotative deceleration of the wheels 13 of the trailing wheel unit subsequently exceeds a rate of five miles per hour per second, the contact member of the relay 37 is again actuated to its closed position to cause pick-up of the relay 52 and the consequent energization of the magnet winding 74 of the slow-release valve 32. Likewise, if slipping of the wheels of the trailing wheel unit again occurs, the above operation is repeated.

It will accordingly be understood that at no time during the application of the brakes are any of the wheels permitted to decelerate to a locked or non-rotative condition and slide. This will be apparent because if slipping of the wheels 13 associated with the leading wheel unit occurs, the contact member of the relay 38 which is in parallel relation with the contact member of the relay 38a, is actuated to its closed position and substantially the same operation occurs, to prevent sliding of the wheels, as previously described.

When the car or train of cars comes to a complete stop in response to the application of the brakes, no change in the degree of application as determined by the pressure of the fluid remaining in the brake cylinders 14 is effected as long as the brake valve handle 17a remains effective to establish a pressure in excess of five pounds per square inch in the control pipe 16.

In order to release the fluid under pressure from the brake cylinders and thus effect release of the brakes, the operator merely returns the brake valve handle 17a to its release position in which the fluid under pressure in the control pipe 16 is completely exhausted to atmosphere through the exhaust port 20 at the brake valve. The contact member a of the pressure switch 67 is returned to its open position, in response to the reduction of the pressure in the control pipe 16 below five pounds per square inch, and thereby interrupts the holding circuit for the winding of the relay 51. Obviously, as long as the pressure in the brake cylinders 14 exceeds ten pounds per square inch, the contact member a of the pressure switch 77 cannot operate to interrupt this holding circuit. It is accordingly necessary to provide the pressure switch 67 under the direct control of the pressure in the control pipe 16 rather than of the pressure in the brake cylinders 14.

When the contact members of the relay 51 are restored to their dropped-out positions in response to the interruption of the holding circuit of the winding of the relay by the pressure switch 67, the magnet winding 71 of the cut-off valve 31 is deenergized due to the interruption of the energizing circuit therefor by contact member c of relay 51. When the magnet winding of the cut-off valve 31 is deenergized, the valve 68 is correspondingly unseated and fluid under pressure may thus be exhausted from the brake cylinders to the control pipe 16 and thence to atmosphere through the exhaust port 20 at the brake valve 17 to effect the complete release of the brakes. The contact members a and b of the pressure switch 77 are correspondingly restored to open position when the pressure in the brake cylinder 14 reduces below ten pounds per square inch.

If the operator starts the car or train in the reverse direction after releasing the brakes, the contact member of the polarized relay 41 is actuated to its closed position to energize the winding of the reversing relay 39 and the pairs of contact members a and b of the reversing relay 39 are correspondingly actuated to the picked-up positions thereof. Accordingly, the condenser charging current always flows in one direction and the condenser discharging current always flows in the opposite direction in the generator circuit, notwithstanding a reversal of polarity of the generators 34 due to a reversal of travel of the car. Thus relays 36, 37, 38 and 39a function in exactly the same manner for reverse travel of the car as for forward travel of the car. A description of the operation of the equipment for reverse travel of the car or train is accordingly deemed unnecessary.

Figure 2:
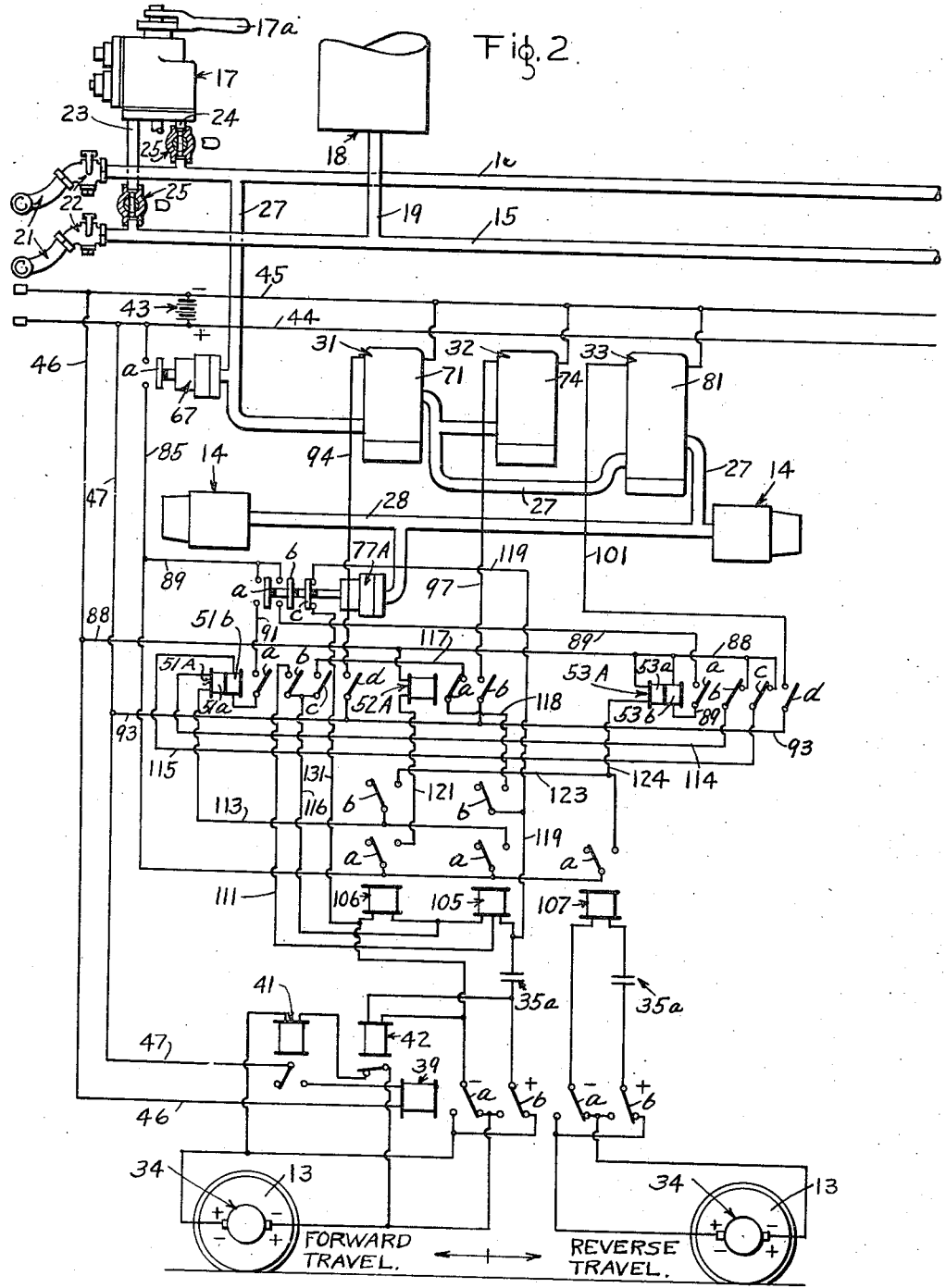
Fig. 2 is a fragmental diagrammatic view showing a modification of the first embodiment.

*Description of embodiment shown in Fig. 2*

The embodiment shown in Fig. 2 is identical to that shown in Fig. 1 as to certain parts of the apparatus and it is accordingly deemed unnecessary to describe these parts except to point out that where the parts in Fig. 2 correspond to those in Fig. 1 they are designated by the same reference numeral as in Fig. 1.

The embodiment shown in Fig. 2 differs from that shown in Fig. 1 in providing two relays 105 and 106 and a condenser 35a in place of the relays 36, 37, 38 and the condenser 35 of Fig. 1, and in providing a relay 107 and condenser 35a in place of the relay 38a and condenser 35 of Fig. 1.

The equipment shown in Fig. 2 differs further from that shown in Fig. 1 in providing three relays 51A, 52A and 53A in place of the relays 51, 52 and 53 of Fig. 1; also in omitting pressure switch 57, volume reservoir 58 and magnet valve device 59 and in providing a pressure operated switch 77A in place of the pressure switch 77 of Fig. 1.

Like the relays 36, 37, 38 and 38a of Fig. 1, the relays 105, 106 and 107 are operatively responsive only to a condenser discharge current in the generator circuit. The electrical condensers 35a differ from the condensers 35 in that they are of different capacities corresponding to the different operating characteristics of the relays in their respective generator circuits.

The relay 105 is provided with an operating winding and two contact members a and b. When the entire winding of the relay 105 is in the generator circuit, a condenser discharge current exceeding a certain value corresponding to a certain rate of rotative deceleration of the car wheels 13, such as four miles per hour per second, is effective to cause operation of the contact members from their open positions in which they are shown to the closed positions thereof, the contact members being automatically restored to their open positions whenever the condenser discharge current reduces below such certain value.

The winding of the relay 105 has a tap connection between the opposite terminals thereof to which a wire 111 is connected, thereby enabling a portion of the winding to be shunted or short-circuited in response to the pick-up of the relay 51A in the manner hereinafter to be described. With the portion of its winding shunted, the contact members a and b of the relay 105 are not actuated from the open to the closed positions thereof unless the condenser discharge current through the remaining unshunted portion of the winding exceeds a certain value corresponding to a rate of rotative deceleration of the associated car wheels 13 of ten miles per hour per second and occurring only when the wheels slip.

It will thus be apparent that relay 105 is responsive to two different rates of rotative deceleration of the car wheels depending upon whether a part or the whole of its operating winding is effective.

The relay 106 has an operating winding and two contact members a and b which are actuated from their open positions, in which they are shown, to their closed positions in response to the energization of the operating winding by a condenser discharge current exceeding a certain value corresponding to a certain rate of rotative deceleration of the car wheels 13 such as five miles per hour per second. When the condenser discharge current energizing the operating winding of the relay 106 reduces below such certain value, the contact members a and b are automatically restored to their open position.

Relay 107 comprises an operating winding and a single contact member a. When the winding of the relay 107 is energized by a condenser discharge current exceeding a certain value corresponding to a certain rate of rotative deceleration of the associated wheels, such as ten miles per hour per second, occurring only when the wheels slip, the contact member *a* is actuated from its open to its closed position. When the current energizing the operating winding of the relay 107 reduces below said certain value, the contact member *a* is automatically restored from its closed to its open position.

It should be understood that the contact members of all the relays 105, 106 and 107 are biased to the open position thereof when the windings of the relays are energized by a condenser charging current corresponding to acceleration of the associated car wheels.

The relay 51A is a two-coil relay of the neutral type having a pick-up winding 51a, a holding winding 51b and four front-contact members *a*, *b*, *c* and *d*. It will be understood that the front-contact members are adapted to be actuated to their picked-up or closed positions in response to energization of the pick-up winding 51a and maintained in their picked-up position by energization of the holding winding 51b.

The relay 52A is a standard relay of the neutral type having an operating winding, a back-contact member *a*, and a front-contact member *b*. It will be understood that contact members *a* and *b* are in closed and open positions respectively as long as the winding of the relay is deenergized and are actuated to open and closed positions respectively upon energization of the winding of the relay.

The relay 53A is a two-coil relay of the neutral type having a pick-up winding 53a, a holding winding 53b, two front-contact members *a* and *d*, and two back-contact members *b* and *c*. The contact members of the relay 53A are actuated to their picked-up positions in response to energization of the pick-up winding 53a and maintained in their picked-up positions by energization of the holding winding 53b.

The pressure operated switch 77A differs from the pressure operated switch 77 in having, in addition to two front-contact members *a* and *b*, a back-contact member *c*; and in being so designed as to cause operation of the contact members *a* and *b* to their closed positions and the contact member *c* to its open position only when the pressure in the brake cylinders 14 increase above a certain pressure such as twenty-five pounds per square inch. The pressure operated switch 77A is, on the other hand, similar to the switch 77 in that the contact members *a* and *b* are returned to their open positions and the contact member *c* is returned to its closed position only when the pressure in the brake cylinder reduces below a pressure, such as ten pounds per square inch.

It is believed unnecessary to describe the specific construction of the pressure operated switch 77A as pressure operated switches adapted to operate at different pressures depending upon whether the pressure is increasing or decreasing, are well known.

*Operation of equipment shown in Fig. 2*

Let is be assumed that the car having the equipment shown in Fig. 2 is traveling under power, with the brakes released, at a speed such as sixty miles per hour and that the operator desires to effect an application of the brakes. To do so the operator shuts off the propulsion power and shifts the brake valve handle 17a to a desired degree out of normal release position to cause charging of the control pipe 16 and the corresponding supply of fluid under pressure to the brake cylinders 14.

As in Fig. 1, if the rate of rotative deceleration of the car wheels 13 associated with the leading wheel unit does not exceed four miles per hour per second no further operation of the equipment occurs and the car is decelerated in response to the degree of application of the brakes corresponding to the pressure established in the brake cylinders 14.

If the degree of application of the brakes as effected by the operator is such, however, as to cause the rate of rotative deceleration of the car wheels 13 to exceed four miles per hour per second, then the contact members *a* and *b* of the relay 105 are actuated from their open to their closed positions.

Contact member *a* of the relay 105 is effective in its closed position to establish a circuit for energizing the pick-up winding 51a of the relay 51A. This circuit extends from the positive battery wire 44 by way of the branch wire 85 including contact member *a* of pressure switch 67, contact member *a* of relay 105, a wire 113, pick-up winding 51a of the relay 51A, wire 114, back-contact member *b* of the relay 53A, and wires 88 and 46 back to the negative battery wire 45.

The contact members of the relay 51A are accordingly actuated to their picked-up or closed positions. In its closed position, the contact member *a* of the relay 51A is effective to establish a holding circuit for energizing the holding winding 51b of the relay 51A. This circuit extends from the positive battery wire 44 by way of the branch wire 85 including the contact member *a* of the pressure switch 67, branch wire 89, wire 91 including contact member *a* of the pressure switch 77A and contact member *a* of relay 51A, holding winding 51b of relay 51A, a wire 115, back contact member *c* of the relay 53A and wires 88 and 46 back to the negative battery wire 45.

Contact member *b* of relay 51A is effective in its closed position to establish a shunt connection around a portion of the winding of the relay 105. The contact member *b* establishes this shunt connection in its closed position by connecting the tap connection wire 111 to a wire 116 which is connected to one terminal of the winding of the relay 105.

Contact member *c* of the relay 51A is effective in its closed position, as long as the contact member *b* of the relay 105 is in its closed position, to establish a shunt connection around the entire winding of the relay 105. This shunt connection extends from the one terminal of the winding of the relay 105 by way of the wire 116, contact member *c* of relay 51A, a wire 117, back contact member *a* of the relay 52A, a wire 118, contact member *b* of the relay 105 in its closed position, and a wire 119 which is connected to the other terminal of the winding of the relay 105.

Due to the shunt connection established by contact members *b* and *c* of relay 51A around the portion of and also around the entire winding of the relay 105, the contact members *a* and *b* of the relay 105 are immediately restored to the open position thereof upon the actuation of the contact members of the relay 51A to their closed positions. Since the contact member *b* of relay 51A is effective when in closed position to establish a shunt connection around a portion of the winding of the relay 105, it will be apparent that although the contact members of relay 105 are restored to their open positions upon the pick-up of the relay 51A, the relay 105 is nevertheless responsive thereafter to an increase of the condenser discharge current to above a value sufficient to actuate the contact members of the relay 105 to their closed position when the car wheels slip at a rate exceeding ten miles per hour per second.

The contact member $d$ of the relay 51A is effective in its closed position to establish a circuit for energizing the magnet winding 71 of the cut-off valve 31. This circuit extends from the positive battery wire 44 by way of the branch wire 47, bus wire 93, contact member $c$ of the relay 51A, and wire 94 including the magnet winding 71 of the magnet valve 31 to the negative battery wire 45.

The cut-off valve 31 is accordingly operated to close communication through the branch pipe 27 leading to the brake cylinders 14 to prevent the further supply of fluid under pressure thereto from the control pipe 16.

If, due to the increase of the coefficient of friction between the brake shoes and the braking surface on the car wheels as the speed of rotation of the car wheels decreases, the rate of rotative deceleration of the car wheels thereafter exceeds five miles per hour per second, the contact members $a$ and $b$ of the relay 106 are actuated from their open to their closed positions. Contact member $a$ of relay 106 is effective in its closed position to establish a circuit for energizing the winding of the reay 52A. This circuit extends from the positive battery wire 44 by way of the branch wire 85 including contact member $a$ of pressure switch 67, contact member $a$ of relay 106, a wire 121 including the winding of the relay 52A, and wires 88 and 46 back to the negative battery wire 45.

The contact member $a$ of the relay 52A is accordingly actuated to open position to prevent the possible subsequent shunting of the entire winding of relay 105 through contact member $c$ of relay 51A if relay 105 is picked-up. Contact member $b$ of relay 52A is actuated to its closed position to establish a circuit for energizing the magnet winding 74 of the slow-release valve 32. This circuit extends from the positive battery wire 44 by way of the branch wire 47, bus wire 93, contact member $b$ of relay 52A, and wire 97 including the magnet winding 74 of the magnet valve 32 to the negative battery wire 45.

The slow-release valve 32 is accordingly operated to vent fluid under pressure from the brake cylinders 14 at a relatively slow rate until the rate of rotative deceleration of the car wheels reduces below five miles per hour per second in response to the decrease of brake cylinder pressure. When the rate of rotative deceleration of the car wheels reduces below five miles per hour per second, the contact members of the relay 106 are restored to their open positions. Due to the restoration of the contact member $a$ of the relay 106 to its open position, the energizing circuit of the magnet winding of the relay 52A is accordingly interrupted and the contact members of the relay 52A are restored to their dropped-out positions.

Contact member $b$ of the relay 52A is effective in its dropped-out or open position to interrupt the energizing circuit of the magnet winding 74 of the slow-release valve 32 which is accordingly operated to closed position to cut-off the further slow release of fluid under pressure from the brake cylinders 14.

If none of the car wheels slip, the operation of the relays 105 and 106 in the manner just described is effective to so control the cut-off and slow-release valves 31 and 32 as to vary the pressure in the brake cylinders 14, as the speed of the car reduces, to maintain a substantially constant rate of retardation of the car.

If any of the car wheels begin to slip, either upon initiation of an application of the brakes or at some time during an application of the brakes, a further operation of the equipment occurs which will now be described.

Let it be assumed that the car wheels 13 associated with the leading wheel unit begin to slip at a time that the car is being decelerated at a rate between four and five miles per hour per second. When the wheels of the leading wheel unit begin to slip, the relay 106 is instantly operated in the manner previously described to effect opening of the slow-release valve 32 to cause release of fluid under pressure from the brake cylinders 14, as previously described.

As previously indicated, however, once the relay 51A is picked-up, the contact members of the relay 105 are restored to the open positions thereof while a portion of the winding 105 remains shunted. Accordingly, when the rate of rotative deceleration of the slipping wheels exceeds a rate corresponding to ten miles per hour per second retardation of the car, the contact members of the relay 105 are again actuated to their closed positions. Due to the contact member $a$ of the relay 52A being in its open position because relay 52A is picked-up in response to the closing of the contact member $a$ of the relay 106, the actuation of the contact member $b$ of relay 105 to its closed position is ineffective to cause shunting of the entire winding of the relay 105. The contact member $a$ of relay 105 is effective in its closed position to establish a circuit for energizing the pick-up winding 53a of the relay 53A. This circuit extends from the positive battery wire 44 by way of the branch wire 85 including contact member $a$ of pressure switch 67, contact member $a$ of relay 105, wire 113, contact member $b$ of relay 106, wire 123, a branch wire 124 including the pick-up winding 53a of the relay 53A, and wires 88 and 46 back to the negative battery wire 45.

The contact member $a$ of relay 53A is effective in its picked-up position or closed position to establish a holding circuit for maintaining the holding winding 53b of relay 53A energized thereafter. This circuit extends from the positive battery wire 44 by way of the branch wire 85 including contact member $a$ of pressure switch 67, branch wire 89 including contact member $b$ of the pressure switch 77A, contact member $a$ of relay 53A and holding winding 53b of the relay 53A to the wire 88, and then by the wires 88 and 46 to the negative battery wire 45.

Due to the opening of the back-contact members $b$ and $c$ of relay 53A, the respective circuits previously traced for energizing the pick-up winding 51a and the holding winding 51b of relay 51A are interrupted. Consequently the contact members of the relay 51A are restored to their dropped-out or open positions. Due to the opening of the contact member $d$ of relay 51A, the circuit for energizing the magnet winding 71 of the cut-off valve 31 is interrupted and the magnet valve 31 is accordingly restored to its normal position permitting the supply of fluid under pressure through the branch pipe 27. However, fluid under pressure is not resupplied to the brake cylinders 14 because the fast-release valve 33 already has its magnet winding 81 energized in response to the closure of the contact member $d$ of relay 53A. This circuit extends from the positive battery wire 44 by way of the branch wire 47, bus wire 93, contact member $d$ of relay 53A, and wire 101 including magnet winding 81 of the fast-release valve 33 to the negative battery wire 45.

Accordingly, although the cut-off valve 31 is opened, the fast-release valve 33 is operated to prevent the supply of fluid under pressure to the brake cylinders 14 and at the same time rapidly release fluid under pressure therefrom.

Due to the instantaneous rapid reduction of the pressure in the brake cylinders 14, the slipping wheels cease to decelerate and begin to accelerate back toward a speed corresponding to vehicle speed. The contact members of the relays 105 and 106 are accordingly restored to the open positions thereof, thereby causing the contact members of relay 52A to be restored to their dropped-out positions and the pick-up winding 53a of relay 53A to be deenergized.

Due to the drop-out of the relay 52A in response to the opening of contact member $a$ of relay 106, the energizing circuit for the magnet winding of the slow-release valve 32 is interrupted by contact member $b$ of relay 52A. The slow-release valve 32 is accordingly operated to closed position to prevent the further release of fluid under pressure thereby from the branch pipe 27.

Relay 53A is not dropped-out in response to the acceleration of the slipping wheels back toward a speed corresponding to vehicle speed due to the continued energization of the holding winding 53b thereof. Accordingly, the relay 53A remains picked-up and the fast-release valve 33 continues to effect the rapid reduction of pressure in the brake cylinders 14 until such time as the pressure in the brake cylinders is reduced to below ten pounds per square inch. When the pressure in the brake cylinders 14 is reduced to below ten pounds per square inch, the contact members $a$ and $b$ of the pressure operated switch 77A are snapped to their open positions and the contact member $c$ to its closed position.

Due to the time required for the pressure in the brake cylinders to be reduced to below ten pounds per square inch, the slipping wheels will have been previously restored to a speed corresponding to vehicle speed and will again be decelerating at a rate corresponding to the average rate of retardation of the car. Thus, when the circuit for energizing the holding winding 53b of the relay 53A is interrupted by the restoration of the contact member $b$ of pressure switch 77A to open position, the restoration of the contact member $b$ of relay 53A to its closed position cannot result in the energization of the pick-up winding 51a of relay 51A, for the reason that contact member $c$ of the pressure operated switch 77A establishes a shunt connection around the windings of both the relays 105 and 106. This shunt connection around the relays 105 and 106 extends from the outside terminal of the winding of the relay 106 by way of a wire 131, contact member $c$ of the pressure operated switch 77A and wire 119 to the outside terminal of the winding of the relay 105.

It will accordingly be seen that the relays 105 and 106 are rendered non-operative as long as the pressure in the brake cylinders 14 remains below a pressure of twenty-five pounds per square inch.

It will be apparent, therefore, that upon the opening of the contact member $d$ of the relay 53A in response to the reduction of the pressure in the brake cylinders to below ten pounds per square inch, the magnet winding 81 of the fast-release valve 33 is deenergized and the valve 33 restored to its normal position cutting-off the further release of fluid under pressure from the brake cylinders and restoring communication through the branch pipe 27 to the brake cylinders.

In view of the fact that the cut-off valve 31 is now open, fluid under pressure is accordingly resupplied to the brake cylinders 14 automatically upon the drop-out of the relay 53A.

When the pressure of the fluid resupplied to the brake cylinders 14 exceeds twenty-five pounds per square inch, the contact members $a$ and $b$ of the pressure operated switch 77A are again snapped to their closed positions and the contact member $c$ to its open position. The opening of the contact member $c$ of the pressure switch 77A opens the shunt connection around the windings of the relays 105 and 106 and the relay 105 is thus rendered responsive to the condenser discharge current flowing in the generator circuit in response to the rotative deceleration of the car wheels at a rate exceeding four miles per hour per second. Obviously, if the car is not being decelerated at a rate exceeding four miles per hour per second, the cut-off magnet valve remains in its open position and fluid under pressure is resupplied to the brake cylinders 14 until such time as the cut-off valve 31 is closed.

If the car is being decelerated at an average rate in excess of four miles per hour per second, the relay 105 is again operated to cause pick-up of the relay 51A and the consequent energization of the magnet winding 71 of the cut-off valve 31 when the pressure switch 77A is operated in response to build-up of pressure in the brake cylinders to above twenty-five pounds per square inch. In such case, therefore, the reestablishment of a fluid pressure exceeding twenty-five pounds per square inch in the brake cylinders 14 results in the immediate closure of the cut-off valve 31 to prevent the further supply of fluid under pressure thereto.

It will thus be seen that if the car is being decelerated at a relatively high rate, the pressure of the fluid restored in the brake cylinders 14 following a slipping of the wheels is automatically limited to a relatively low value sufficient to prevent the recurrence of wheel slipping.

If the wheels associated with the trailing wheel unit begin to slip, the contact member $a$ of the relay 107, which parallels contact members $a$ and $b$ of relays 105 and 106 respectively, is actuated to its closed position to establish the circuit for energizing the pick-up winding 53a of the relay 53A. The fast-release valve 33 is accordingly operated, as before, to effect a rapid reduction of the pressure in the brake cylinders 14.

As in the case of the embodiment shown in Fig. 1, the pressure of the fluid remaining in the brake cylinders when the car comes to a complete stop may be released therefrom, to effect release of the brakes prior to again starting the car, by restoring the brake valve handle 17a to its release position.

Summary

Summarizing, it will be seen that I have disclosed two embodiments of a brake control equipment for automatically controlling the degree of application of the brakes on a railway car to effect a substantially uniform rate of retardation of the car and effective also, in the event of slipping of one or more pairs of car wheels, to rapidly release the brakes on such slipping wheels, individually, and thereby prevent the sliding thereof.

In both equipments, a cut-off magnet valve, a slow-release magnet valve, and a fast-release magnet valve are provided. The cut-off and slow-release magnet valves are successively operated under the control of electrical apparatus responsive to the rotative deceleration of individual pairs of car wheels at rates in excess of certain values, such as four miles per hour per second and five miles per hour per second, respectively, to automatically vary the brake cylinder pressure, as the speed of the car or train reduces, so as to maintain a substantially uniform rate of retardation of the car somewhere between four and five miles per hour per second. The fast-release magnet valve is energized whenever a wheel slips for effecting a rapid reduction of the pressure in the brake cylinders for the corresponding wheel truck, to cause the slipping wheels on that truck to cease to decelerate and accelerate back to a speed corresponding to vehicle speed without reducing to a locked condition and sliding.

In one embodiment, I provide an electrical apparatus including three relays responsive respectively to three different rates of rotative deceleration of the car wheels whereas in the second embodiment only two relays are employed, one of which relays is responsive selectively to a certain low deceleration rate or a certain high deceleration rate that occurs only when the wheel slips, while the other relay is responsive to an intermediate rate of deceleration of the car wheels. The second embodiment, in addition to reducing the number of relays required, eliminates certain other equipment employed in the first embodiment.

While I have shown and described only two embodiments of my invention, it will be apparent that various omissions, additions, or modifications may be made in the embodiments shown without departing from the spirit of my invention. Accordingly, while I have shown certain specific embodiments of my invention, I do not intend any limitations except as defined by the terms of the appended claims.

Having now described my invention, what I claim as new and desire to secure by Letters Patent, is:

1. Vehicle wheel brake control apparatus comprising manually controlled means for effecting application and release of the brakes associated with the wheels of the vehicle, means adapted to supply an electrical effect substantially proportional to the rate of change of rotational speed of a given vehicle wheel, means controlled according to the electrical effect supplied by said means for so controlling the degree of application of the brakes associated with said given wheel, while the manually controlled means is effective to cause application of the brakes, as to regulate the rate of rotative deceleration of said given wheel to a substantially uniform rate, and means operative only in response to an electrical effect in excess of a certain value occurring only when the given vehicle wheel slips for effecting a rapid reduction in the degree of application of the brakes associated with said given wheel to prevent sliding of the given wheel.

2. In a brake control apparatus for a railway car or train having a plurality of wheel trucks each of which trucks has a plurality of separately rotatable wheel units, the combination of manually controlled means for effecting application and release of the brakes associated with the wheel units of all the trucks, individual means for each wheel unit adapted to supply an electrical effect substantially proportional to the rate of change of rotational speed of the wheel unit, means controlled according to the electrical effect supplied by the said individual means of one wheel unit of a truck for so controlling the degree of application of the brakes associated with all wheel units of that truck as to regulate the rotative deceleration thereof to a substantially uniform rate, and means effective in response to an electrical effect supplied by the individual means of any of the wheel units of a given truck exceeding a certain value occurring only when the wheel units slip for effecting a rapid reduction in the degree of application of the brakes associated only with the wheel units of that truck whereby to prevent sliding of such wheel units.

3. Vehicle wheel brake control apparatus comprising manually controlled means for effecting application and release of the brakes associated with the wheels of the vehicle, individual means for each of a plurality of wheels adapted to supply a voltage substantially proportional to the rotational speed of the corresponding wheel, means controlled according to the rate of change of the voltage supplied by a certain one of the said individual means for controlling the degree of application of the brakes associated with all of the said plurality of wheels so as to regulate the rotative deceleration thereof to a substantially uniform rate, and means operative in response to the change of voltage supplied by any of said individual means at a rate exceeding a certain rate and occurring only when the corresponding wheels slip for effecting a rapid reduction in the degree of application of the brakes associated with all of the said plurality of wheels to prevent the sliding of the wheels.

4. Vehicle wheel brake control apparatus comprising manually controlled means for effecting application and release of the brakes associated with the wheels of the vehicle, an individual electrical circuit for each separately rotatable wheel unit, individual means for each separately rotatable wheel unit adapted to cause a flow of current in each of said circuit substantially proportional to the rate of rotative deceleration of the corresponding wheel unit, electrical means in one of said circuits responsive to the variations of current therein during an application of the brakes for so controlling the degree of application of the brakes associated with a plurality of wheel units including the wheel unit corresponding to the said one circuit as to regulate the rotative deceleration of the said plurality of wheel units to a substantially uniform rate, and electrical means in each of said circuits operatively responsive during an application of the brakes to a current exceeding a certain value and occurring only when the corresponding wheel unit slips, any of the last said electrical means being effective to cause a rapid reduction in the degree of application of the brakes associated with all of the said plurality of wheel units to prevent sliding of the wheel units.

5. Vehicle wheel brake control apparatus comprising, in combination, a pipe adapted to be charged with fluid at different pressures corresponding to a desired degree of application of the brakes, a fluid pressure operated device for operating the brakes associated with a given wheel unit, a communication through which fluid under pressure is supplied from said pipe to said fluid pressure operated device to effect application of the brakes, an electrical circuit, means adapted to cause a flow of current in said circuit substantially proportional to the rate of rotative deceleration of said given wheel unit, a first relay in said circuit operatively responsive only to a current exceeding a certain value corresponding to a first certain rate of rotative deceleration of the given wheel unit, a second relay in said circuit operatively responsive only to a current exceeding a second certain value corresponding to a second certain rate of rotative deceleration of the wheel unit higher than the said first certain rate, a first magnet valve device adapted to close said communication upon operation of the first relay to prevent the further supply of fluid under pressure to the fluid pressure operated device, and a second magnet valve device effective to cause a slow release of fluid under pressure from the fluid pressure operated device as long as the said second relay is operated, said magnet valve devices being effective to so control the pressure supplied to the fluid pressure operated device as to regulate the degree of rotative deceleration of the given wheel unit to a substantially uniform rate between the first said certain rate and the second said certain rate.

6. Vehicle wheel brake control apparatus comprising, in combination, a pipe adapted to be charged with fluid at different pressures corresponding to a desired degree of application of the brakes, a fluid pressure operated device for operating the brakes associated with a given wheel unit, a communication through which fluid under pressure is supplied from said pipe to the fluid pressure operated device to effect application of the brakes, an electrical circuit, means adapted to cause a flow of current in said circuit substantially proportional to the rate of deceleration of the wheel unit, a first relay in said circuit operatively responsive only to a current exceeding a certain value corresponding to a first certain rate of rotative deceleration of the wheel unit, a second relay in said circuit operatively responsive only to a current exceeding a second certain value corresponding to a second certain rate of rotative deceleration of the wheel unit higher than the said first certain rate, a third relay in said circuit operatively responsive only to a current exceeding a third certain value corresponding to a third certain rate of rotative deceleration of the wheel unit higher than the said second certain rate and occurring only when the wheel unit slips, a first magnet valve means effective upon operation of the first relay to close the said communication to prevent the further supply of fluid under pressure to the fluid pressure operated device, a second magnet valve device adapted to release fluid under pressure from the fluid pressure operated device at a relatively slow rate in response to the operation of said second relay, and a third magnet valve device adapted to release fluid under pressure from the said fluid pressure operated device at a relatively fast rate in response to the operation of the said third relay.

7. Vehicle wheel brake control apparatus comprising, in combination, a pipe adapted to be charged with fluid at different pressures corresponding to a desired degree of application of the brakes, a fluid pressure operated device for operating the brakes associated with a given wheel unit, a communication through which fluid under pressure is supplied from said pipe to the fluid pressure operated device to effect application of the brakes, an electrical circuit, means adapted to cause a flow of current in said circuit substantially proportional to the rate of deceleration of the wheel unit, a first relay in said circuit operatively responsive only to a current exceeding a certain value corresponding to a first certain rate of rotative deceleration of the wheel unit, a second relay in said circuit operatively responsive only to a current exceeding a second certain value corresponding to a second certain rate of rotative deceleration of the wheel unit higher than the said first certain rate, a third relay in said circuit operatively responsive only to a current exceeding a third certain value corresponding to a third certain rate of rotative deceleration of the wheel unit higher than the said second certain rate and occurring only when the wheel unit slips, a first magnet valve means effective upon operation of the first relay to close the said communication to prevent the further supply of fluid under pressure to the fluid pressure operated device, a second magnet valve device adapted to release fluid under pressure from the fluid pressure operated device at a relatively slow rate in response to the operation of said second relay, a third magnet valve device adapted to release fluid under pressure from the said fluid pressure operated device at a relatively fast rate in response to the operation of the said third relay, and means effective whenever the said third magnet valve is operated to reduce the fluid pressure in the fluid pressure operated device for causing it to continue to reduce such pressure until the fluid pressure in the fluid pressure operated device decreases below a certain low pressure and then effective to cause it to be restored to its normal position permitting the resupply of fluid under pressure to the fluid pressure operated device.

8. Vehicle wheel brake control apparatus comprising, in combination, a pipe adapted to be charged with fluid at different pressures corresponding to a desired degree of application of the brakes, a fluid pressure operated device for operating the brakes associated with a given wheel unit, a communication through which fluid under pressure is supplied from said pipe to the fluid pressure operated device to effect application of the brakes, an electrical circuit, means adapted to cause a flow of current in said circuit substantially proportional to the rate of deceleration of the wheel unit, a first relay in said circuit operatively responsive only to a current exceeding a certain value corresponding to a first certain rate of rotative deceleration of the wheel unit, a second relay in said circuit operatively responsive only to a current exceeding a second certain value corresponding to a second certain rate of rotative deceleration of the wheel unit higher than the said first certain rate, a third relay in said circuit operatively responsive only to a current exceeding a third certain value corresponding to a third certain rate of rotative deceleration of the wheel unit higher than the said second certain rate and occurring only when the wheel unit slips, a first magnet valve means effective upon operation of the first relay to close the said communication to prevent the further supply of fluid under pressure to the fluid pressure operated device, a second magnet valve device adapted to release fluid under pressure from the fluid pressure operated device at a relatively slow rate in response to the operation of said second relay, a third magnet valve device adapted to release fluid under pressure from the said fluid pressure operated device at a relatively fast rate in response to the operation of the said third relay, means effective whenever the said third magnet valve is operated to reduce the fluid pressure in the fluid pressure operated device for causing it to continue to reduce such pressure until the fluid pressure in the fluid pressure operated device decreases below a certain low pressure and then effective to cause it to be restored to its normal position permitting the resupply of fluid under pressure to the fluid pressure operated device, and means effective upon operation of the said third relay for short-circuiting the operating windings of all of said relays and effective to remove said short-circuit only upon the elapse of a predetermined interval of time after the pressure in the fluid pressure operated device reduces to below said certain low pressure.

9. Vehicle wheel brake control apparatus comprising manually controlled means for effecting application and release of the brakes associated with the wheels of the vehicle, means providing an electrical effect substantially proportional to the rate of rotative deceleration of a given vehicle wheel, a first relay responsive to an electrical effect supplied by said means exceeding a first certain value for preventing further increase in the degree of application of the brakes associated with the given wheel, and a second relay operatively responsive only to an electrical effect exceeding a second certain value higher than the said first certain value for effecting a relatively slow reduction in the degree of application of the brakes associated with the given wheel, said first and said second relays being effective to so regulate the degree of application of the brakes associated with the given wheel as to cause the given wheel to rotatively decelerate at a substantially uniform rate.

10. Vehicle wheel brake control apparatus comprising manually controlled means for effecting application and release of the brakes associated with the wheels of the vehicle, means providing an electrical effect substantially proportional to the rate of rotative deceleration of a given vehicle wheel, a first relay responsive to an electrical effect supplied by said means exceeding a first certain value for preventing further increase in the degree of application of the brakes associated with the given wheel, a second relay operatively responsive only to an electrical effect exceeding a second certain value higher than the said first certain value for effecting a relatively slow reduction in the degree of application of the brakes associated with the given wheel, said first and said second relays being effective to so regulate the degree of application of the brakes associated with the given wheel as to cause the given wheel to rotatively decelerate at a substantially uniform rate, means effective once the said first relay responds to a degree of electrical effect exceeding said first certain value for rendering it thereafter non-responsive except to a degree of electrical effect exceeding a third certain value higher than the said second certain value and occurring only when the said given wheel slips, and means responsive to the operation of said first relay when the said given wheel slips for effecting a relatively rapid reduction in the degree of application of the brakes associated with the given wheel to prevent the sliding thereof.

11. Vehicle wheel brake control apparatus comprising manually controlled means for effecting application and release of the brakes associated with the wheels of the vehicle, an electrical circuit, means for causing a current to flow in said circuit substantially proportional to the rate of rotative deceleration of a given vehicle wheel, a first relay in said circuit operative in response to a current exceeding a first certain value corresponding to a certain rate of rotative deceleration of the given wheel, means effective in response to operation of said first relay to prevent further increase in the degree of application of the brakes associated with said given wheel, means effective once the said first relay is operated for rendering the last said means effective thereafter independently of the said first relay, means effective, upon operation of said first relay, to short-circuit a portion of the operating winding of said first relay whereby to render said first relay thereafter responsive only to a current exceeding a second certain value higher than the first said certain value and occurring only when the given wheel slips, a second relay in said circuit operatively responsive only to a current exceeding a third certain value higher than the first said certain value but less than the second certain value, means effective in response to the operation of said second relay for effecting a relatively slow reduction in the degree of application of the brakes associated with the given wheel, and means controlled jointly by said first and said second relays and effective upon operation of said first relay in response to a current exceeding said second certain value for effecting a relatively rapid reduction in the degree of application of the brakes associated with the said given wheel whereby to prevent the sliding thereof.

12. Vehicle wheel brake control apparatus comprising manually controlled means for effecting application and release of the brakes associated with the wheels of the vehicle, an electrical circuit, means for causing a current to flow in said circuit substantially proportional to the rate of rotative deceleration of a given vehicle wheel, a first relay in said circuit operative in response to a current exceeding a first certain value corresponding to a certain rate of rotative deceleration of the given wheel, means effective in response to operation of said first relay to prevent further increase in the degree of application of the brakes associated with said given wheel, means effective once the said first relay is operated for rendering the last said means effective thereafter independently of the said first relay, means effective, upon operation of said first relay, to short-circuit a portion of the operating winding of said first relay whereby to render said first relay thereafter responsive only to a current exceeding a second certain value higher than the first said certain value and occurring only when the given wheel slips, a second relay in said circuit operatively responsive only to a current exceeding a third certain value higher than the first said certain value but less than the second certain value, means effective in response to the operation of said second relay for effecting a relatively slow reduction in the degree of application of the brakes associated with the given wheel, means controlled jointly by said first and said second relays and effective upon operation of said first relay in response to a current exceeding said second certain value for effecting a relatively rapid reduction in the degree of application of the brakes associated with the said given wheel whereby to prevent the sliding thereof, and means effective, once the last said means initiates a rapid reduction in the degree of application of the brakes, to cause it to continue the reduction until the application decreases below a certain low degree and then effective to cause it to initiate an increase in the degree of application of the brakes.

13. Vehicle wheel brake control apparatus comprising manually controlled means for effecting application and release of the brakes associated with the wheels of the vehicle, an electrical circuit, means for causing a current to flow in said circuit substantially proportional to the rate of rotative deceleration of a given vehicle wheel, a first relay in said circuit operative in response to a current exceeding a first certain value corresponding to a certain rate of rotative deceleration of the given wheel, means effective in response to operation of said first relay to prevent further increase in the degree of application of the brakes associated with said given wheel, means effective once the said first relay is operated for rendering the last said means effective thereafter independently of the said first relay, means effective, upon operation of said first relay, to short-circuit a portion of the operating winding of said first relay whereby to render said first relay thereafter responsive only to a current exceeding a second certain value higher than the first said certain value and occurring only when the given wheel slips, a second relay in said circuit operatively responsive only to a current exceeding a third certain value higher than the first said certain value but less than the second certain value, means effective in response to the operation of said second relay for effecting a relatively slow reduction in the degree of application of the brakes associated with the given wheel, means controlled jointly by said first and said second relays and effective upon operation of said first relay in response to a current exceeding said second certain value for effecting a relatively rapid reduction in the degree of application of the brakes associated with the said given wheel whereby to prevent the sliding thereof, means effective, once the last said means initiates a rapid reduction in the degree of application of the brakes, to cause it to continue the reduction until the application decreases below a certain low degree and then effective to cause it to initiate an increase in the degree of application of the brakes, and means adapted to short-circuit the operating windings of both of said relays whenever the application of the brakes is reduced below said certain low degree and adapted to maintain said relays short-circuited until the degree of application of the brakes is restored beyond a second certain degree substantially higher than said certain low degree.

CLAUDE M. HINES.